United States Patent [19]
Levy et al.

[11] Patent Number: 5,812,851
[45] Date of Patent: Sep. 22, 1998

[54] COMPILER WITH GENERIC FRONT END AND DYNAMICALLY LOADABLE BACK ENDS

[75] Inventors: Jacob Y. Levy, Los Altos; Swee Boon Lim, Moutain View; Donald J. Kretsch, Cupertino; Wesley E. Mitchell, Sunnyvale; Benjamin Lerner, Palo Alto, all of Calif.

[73] Assignee: Sun Microsystems, Inc., Mountain View, Calif.

[21] Appl. No.: 822,110

[22] Filed: Mar. 21, 1997

Related U.S. Application Data

[62] Division of Ser. No. 412,546, Mar. 29, 1995, abandoned.
[51] Int. Cl.$^6$ .................................................. G06F 9/45
[52] U.S. Cl. ........................... 395/705; 395/707; 395/708
[58] Field of Search ..................................... 395/705, 707, 395/708

[56] References Cited

PUBLICATIONS

Pountain, D., "Parallel Course", BYTE, vol. 19, No. 7, pp. 53–60, Jul., 1994.

IBM Technical Disclosure Bulletin, "Method for Handling Intermediate Language Imposed Rules in Stream Based Architectures", vol. 38, No. 02, pp. 615–617, Feb., 1995.

Tanenbaum, A.S., Staveren, H.V., Keizer, E.G. and Stevenson, J.W., "A Practical Tool Kit for Making Portable Compilers", Computer Practices, Communications of the ACM, vol. 26, No. 9, pp. 654–660, Sep., 1983.

Hatcher, P.J. and Tuller, J.W., "Efficient Retargetable Compiler Code Generation", The Computer Science Society, 1988 International Conference on Computer Languages, pp. 25–30, Oct., 1988.

*Primary Examiner*—Lucien U. Toplu
*Assistant Examiner*—Peter J. Corcoran, III
*Attorney, Agent, or Firm*—Fenwick & West LLP

[57] ABSTRACT

A system and method provides for variable target outputs from a compiler with only a single execution. The compiler includes a front end, a generic back end, and plurality of individual back ends that are dynamically loaded by the compiler during execution. The front end produces an abstract syntax tree which is then processed by the generic back end and the individual back ends to produce a number of back end trees, each adapted for a specific back end, and representative of the desired structure of the various target outputs, including target code files, or events. The generic back end traverses the abstract syntax tree, and on each node of the tree, invokes each back end that has a node of its back end tree attached thereto. The back end can then modify its own back end tree, and attach further back end nodes to other nodes of the abstract syntax tree. In turn the generic back end will invoke such added attached nodes, until all attached back end nodes on all the nodes of the abstract syntax tree have been processed. This results in completed back end trees for all of the back ends, requiring only a single pass of the front end to produce the abstract syntax tree. The individual back ends then process their respective back end trees to produce their target outputs. A look up operation is provided in the generic back end that returns one or more back end nodes in response to a request therefore specifying a node of the abstract syntax tree, and a family identification value of a back end node.

17 Claims, 8 Drawing Sheets

COMPILER WITH GENERIC FRONT END AND DYNAMICALLY LOADABLE BACK ENDS

This is a divisional of application Ser. No. 08/412,546 filed on Mar. 29, 1995 abandoned.

BACKGROUND

1. Field of the Invention

The invention relates generally to methods and systems for compiling source code files into numerous executable and related output files, and more particularly, to methods and systems that use dynamic loading of compiler back ends for variable compilation outputs.

2. Background of the Invention

In conventional computer code development environment, a compiler is used to create various types of target code files from source code files. Conventional compilers include a front end unit and one or more dedicated back end units. The front end typically includes a scanner that reads the input source code files and outputs tokens relevant to the programming language used in the source code. The front end also typically includes a parser that takes the token sequences of the scanner and creates an abstract syntax tree of the file representing the grammatical structure of the tokens. A typical compiler may have one or more back ends, each of which identifies the data types of the tokens in the abstract syntax tree, their source locations, and other information, and creates a back end tree from this information. From its back end tree, a back end will produce a particular type of target output. The target outputs of the back ends include code files, such as header files, data type files, skeleton code files, stub code files, and the like, or a particular sequence of actions, such as loading an interface repository for object definitions, or creating a persistent storage database.

In a conventional compiler, the back ends are dedicated and integral to the compiler. This means that the user of the compiler cannot create new back ends for use with the compiler front end to generate target code suitable for the user's particular needs. This generally prevents vendors, other than the vendor of the compiler, from producing independent back ends that produce machine dependent target outputs for use with a variety of front ends. In addition, even where there are multiple back ends, each back end operates on a specific intermediate file format output from the front end. The front end must be able to generate these different intermediate files for each back end. Thus, while the compiler may provide for different back end outputs, the front end must be executed each time to generate the desired intermediate files, thereby increasing the time needed to compile the various target code files.

Accordingly, it is desirable to provide a compiler design in which the back ends are independent of the front end, and may be dynamically invoked at compile time as desired by the user. It is further desirable to provide a front end that can interface with multiple back ends efficiently without having to produce intermediate files.

SUMMARY OF THE INVENTION

The present invention overcomes these various limitations by providing a compiler with a generic back end capable of operating with a number of independent back ends that are loaded at run time. Each back end creates its own back end tree adapted to the outputs of the back end. The compiler includes a front end that produces an abstract syntax tree from an input source code file. The abstract syntax tree is comprised of nodes representing tokens in the source code file. The generic back end includes an attach operation that attaches to a selected node of the abstract syntax tree a back end node from a given back end tree. The generic back end iterates over the nodes of the abstract syntax tree, invoking on each node of the original abstract syntax tree all of the nodes of the back end tree attached thereto. Each such back end includes an add operation that processes a node of the abstract syntax tree to determine whether the back end tree should be modified to include one or more back end nodes for the abstract syntax tree node. When a new back end node is so added, it may also be attached to some other node of the abstract syntax tree. In this fashion, each independent back end can create its own back end tree, based on only a single pass by the front end compiler to create the abstract syntax tree. The generic back end manages the operation of the individual back ends so that each back end will analyze the abstract syntax tree in the correct order with respect to other back ends. The generic back end also includes a look up operation that returns zero or more nodes in a back end tree in response to request from other nodes in other back end trees, based on specified family identification values. This allows a node in one back end tree to refer to a node in another back end.

DETAILED DESCRIPTION OF THE INVENTION

System Architecture

Figure 1:
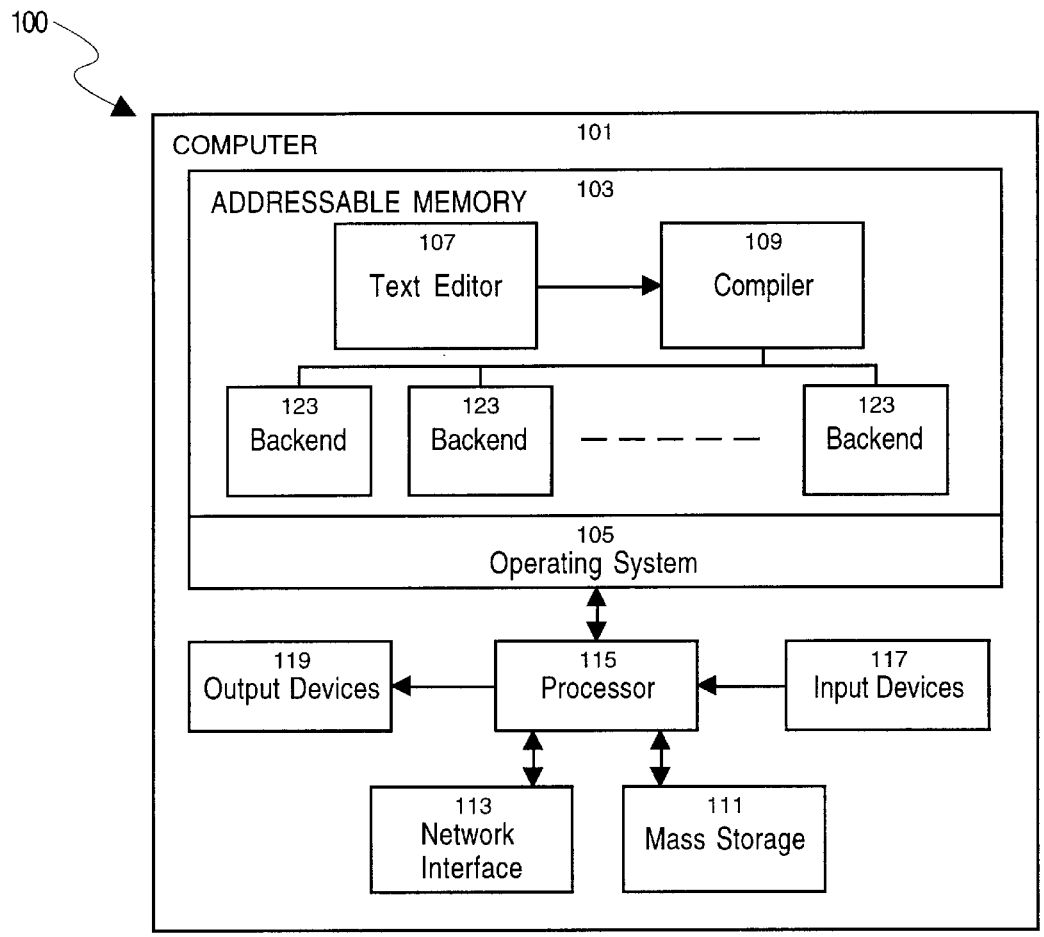
FIG. 1 is a block diagram of a computer system including the compiler of the present invention.

Referring now to FIG. 1, there is shown one embodiment of a system providing the improved compiler with dynamically loadable back ends. The system 100 includes a computer 101, having an addressable memory 103, a text editor 107, the compiler 109, and a plurality of independent back ends 123. The computer 101 is of conventional design, including a processor 115, input 117 and output devices 119, a network interface 113, and a mass storage device 111. The computer 101 may be realized by most general purposes computers, such as a SPARCstation™ computer manufactured by Sun Microsystems, Inc. of Mountain View, Calif. Any other general purpose computer may also be adapted for use with the invention. Computer 101 executes a general purpose operating system 105, such as Sun Microsystems' Solaris® operating system. The processor 115 executes the text editor 107, compiler 109, and back ends 123, including all of the operations thereof. The processor 115 also reads and writes source code files, and target output files to and from the mass storage device 111 during execution of the text editor 107 and compiler 109.

The text editor 107 is a conventional editor for creating and editing source code text files. The editor 107 provides conventional source code output as an ASCII or equivalent text file. The source code may be in any high level language, such as C, C++, SmallTalk, and the like.

Figure 2:
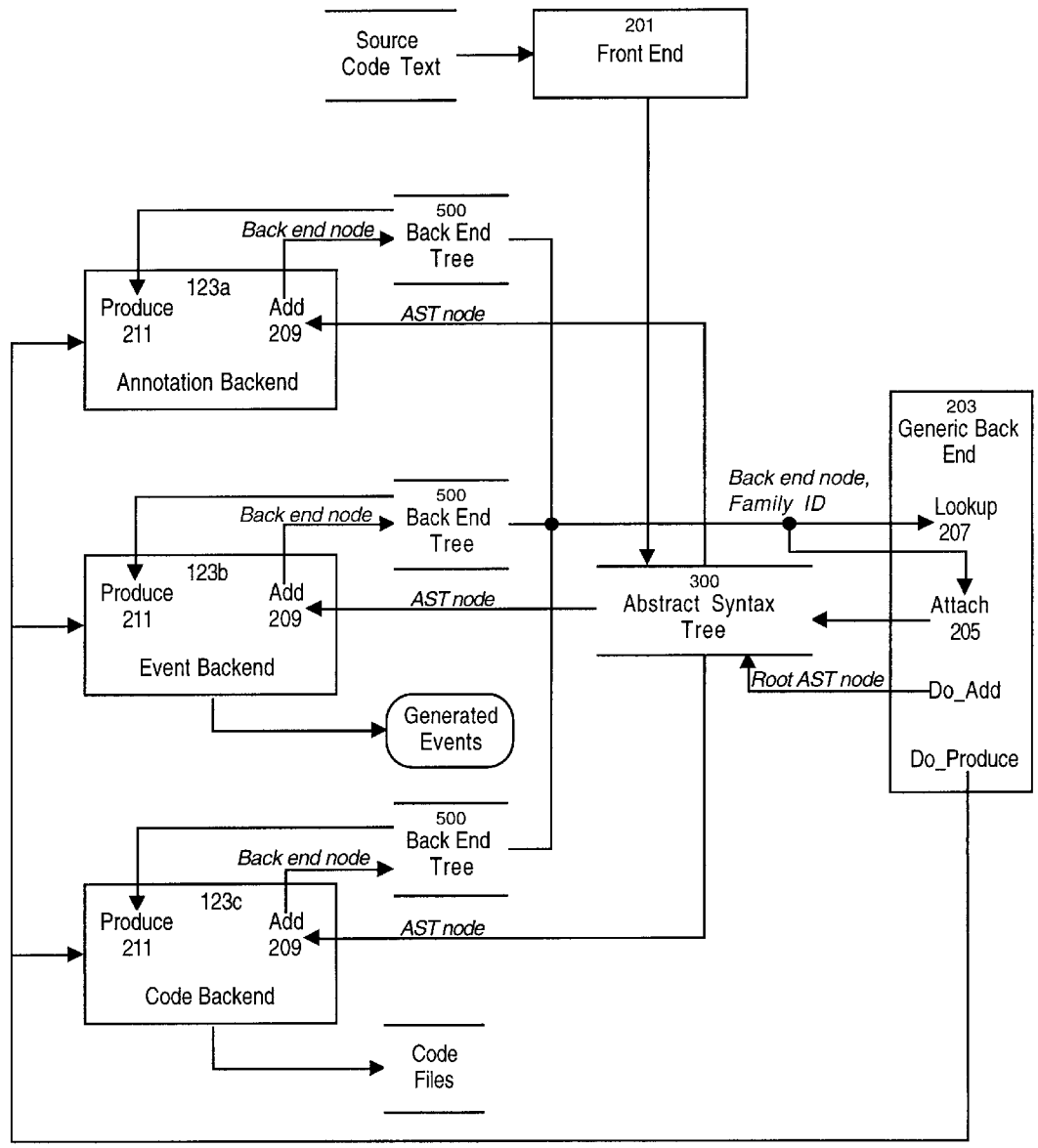
FIG. 2 is a dataflow diagram of the operation and structure of the compiler of the present invention.

Referring now to FIG. 2, there is shown a dataflow diagram of the compiler 109 in cooperation with the back ends 123. The compiler 109 includes a front end 201 that receives the source code text files and creates therefrom in a conventional manner an abstract syntax tree. The abstract syntax tree is a graph representation of the syntax and structure of the source code text file. In a preferred embodiment, the compiler 109 operates on interface definition language (IDL) files that define object interfaces for distributed objects. In this preferred embodiment, the front end 201 produces an abstract syntax tree of an input IDL file or files.

In conjunction with the back ends 123, the compiler 109 may generate a variety of different target outputs. These target outputs include various header or code files, or actions upon other files or resources. For example, for a given input file x.idl, a preferred embodiment of the compiler 109 and back ends 123 may produce target output files such as x.hh, xsurrogates.hh, xsurrogates.cc, xmarshal.hh, xmarshal.cc, xtypes.hh, and xtypes.cc. Each of these target output files contain descriptions of data types, stubs and skeletons, and supporting marshaling routines, and is produced by one of the back ends 123. A back end 123 may produce any number of actions as target outputs, instead of producing files. For example, a back end 123 may load an interface repository with interface definitions derived from a given IDL file. To produce its particular output, each back end 123 usually requires more information than is available in the abstract syntax tree. Likewise, each back end 123 may use only certain information from the abstract syntax tree. For both of these reasons, each back end 123 creates its own back end tree that is particularly adapted to its target outputs.

The front end 201 provides the abstract syntax tree to a generic back end 203. The generic back end 203 coordinates the construction of the back end trees by the individual back ends 123. Each back end tree is derived from the abstract syntax tree, and is particularly adapted to an individual back end 123 for producing the target output from that back end 123. The discussion herein will refer to the abstract syntax tree and the individual back end trees, but it is understood that such "trees" are more generally defined as graphs, without the formal constraints of tree structures.

Figure 3A:
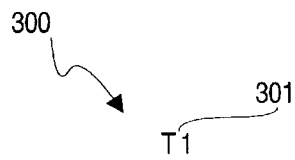
FIGS. 3a through 3f are various illustrations of a canonical abstract syntax tree at different stages of processing.
Figure 3B:
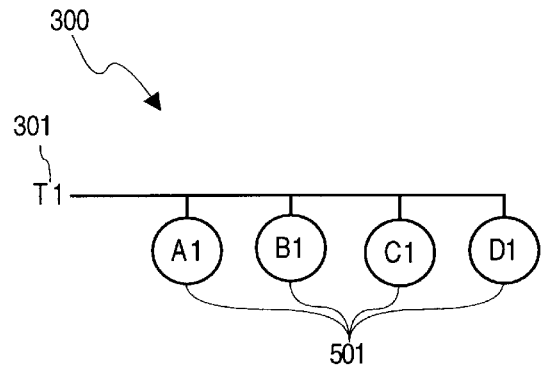
Figure 3C:
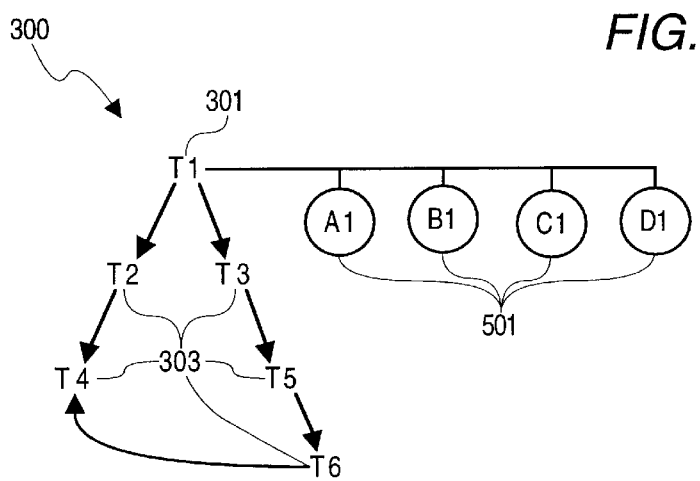
Figure 3E:
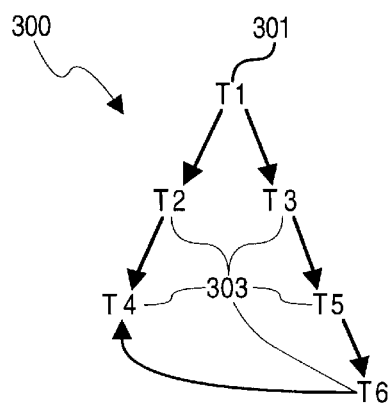

FIG. 3e is a canonical illustration of a sample abstract syntax tree, herein abbreviated as "AST." The abstract syntax tree 300 is comprised of nodes, including the root AST node 301, and a number of child AST nodes 303. Each node in the abstract syntax tree 300 is an object with attributes that describe the source code token it represents, and operations for returning or modifying the node information. Both the root AST node 301 and the child AST nodes 303 will be jointly referred to as AST nodes 309 (not illustrated) when necessary. For ease of individual identification, the various nodes 309 are labeled T1 through T6 to denote their relative position in the abstract syntax tree 300. A given AST node may refer not just to its child nodes, but to any other AST node in the abstract syntax tree 300, for example, to provide a definition of a data type, or other useful information. For example, node T6 contains a reference to node T4.

Figure 3F:
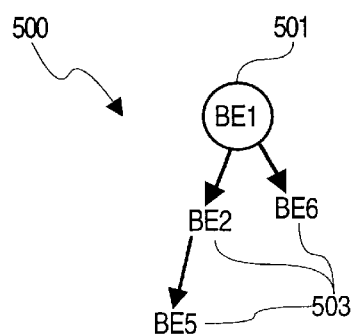
Figure 3D:
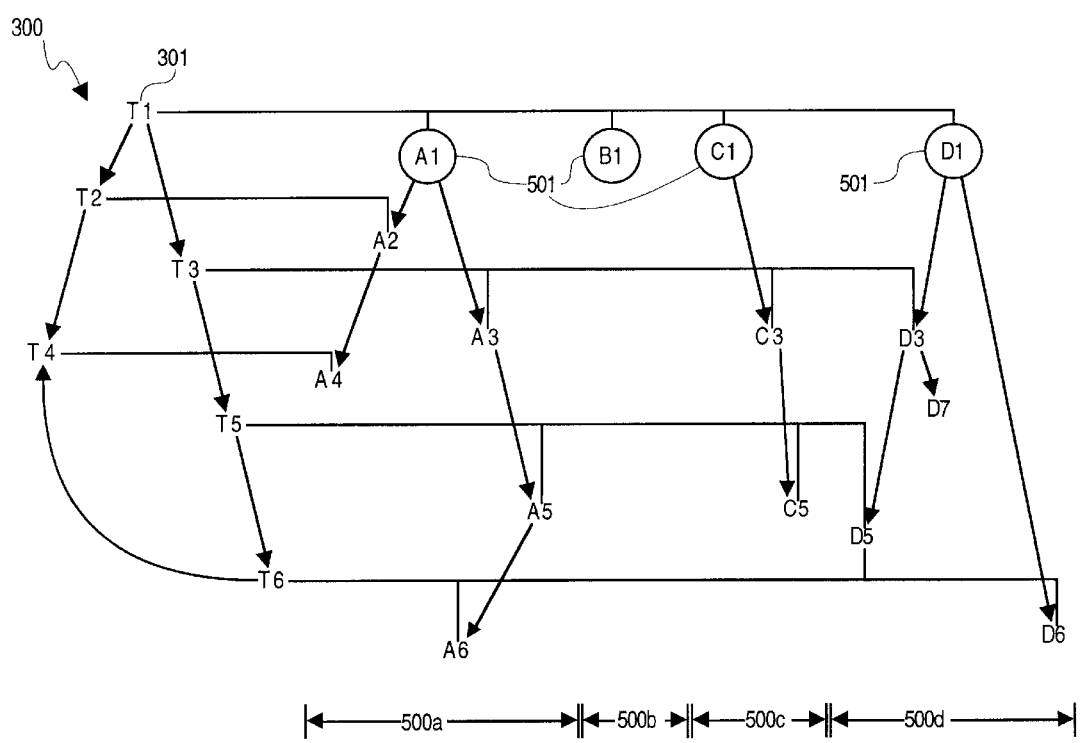

Each back end 123 produces its own back end tree 500 in coordination with the generic back end 201. FIG. 3f is an illustration of a sample back end tree derived from the abstract syntax tree 300. Each back end tree 500 includes a root back end node 501 and a number of child back end nodes 503. Both the root back end node 501 and the child back end nodes 503 will be jointly referred to as back end nodes 509 (not illustrated) when necessary. Each of the back end nodes 509 may correspond to one or more of the AST nodes 309, and accordingly, the structure of a back end tree 500 need not be a subset of the abstract syntax tree 300. This is illustrated in FIG. 3d with node D6 depending from the root back end node D1 rather than node D5. In addition, each back end node 509 may be attached to one or more AST nodes 309; this form of attachment is shown in FIG. 3d for node D5 which is attached to AST nodes T5 and T6. A back end, node 509 may be directly attached to an AST node 309, or indirectly attached through an intermediate data structure. References to the back end tree 500 and back end nodes 509 in the remainder of this disclosure are intended to refer to any back end tree 500 and node 509 in general, and not to the specific illustrated trees shown in FIGS. 3a–f.

Referring again to FIG. 2, in the preferred embodiment, there are three general types of back ends 123: an annotation back end 123a, an event generating back end 123b, and a code generating back end 123c. An annotation back end 123a provides information that describes individual data types defined in the source code text files output from the text editor 107. This information includes, for example, type codes, data type sizes, name mangling support, and the like for a given target language, such as C or C++. An annotation back end 123a does not generate code, but rather, creates its own back end tree that provides information that will be used by code generating back ends 123c and event generating back end 123b to output the desired target output file or target actions. An event generating back end 123b generates target actions providing additional functionality to the system, such as loading an interface repository with interface definitions in an IDL file. A code generating back end 123c generates actual code files, as described above, in a specified language such as C, C++, or the like. In alternate embodiments zero or more instances of the various types of back ends 123a–c may be used.

The back ends 123 are not integrated directly with the generic back end 203, but may be selectively loaded during execution of the compiler 109 by the processor 115. In addition, a user of the system 100, such as an applications developer, can design other back ends, and use them directly with the compiler 109 without having to recreate the compiler 109 itself.

The generic back end 203 includes operations for manipulating the abstract syntax tree 300. These operations include a lookup operation 207 that provides a back end 123 with zero or more back end nodes 509 of other back end trees 500 attached to a specified node 309 of the abstract syntax tree 300. The generic back end 203 further preferably includes an attach operation 205. The attach operation 205 attaches a specified back end node 509 to some AST node(s) 309. The back ends 123 may invoke these operations of the generic back end 203 during their processing of the abstract syntax tree 300. The back ends 123 also include specific operations that may be invoked by the generic back end 203. An add operation 209 of a back end 123 adds zero or more nodes 509 to a back end tree 500 based on a specified node 309 in the abstract syntax tree 300. A produce operation 211 of a back end 123 analyzes the back end tree 500 associated with the back end 123 and produces the target output, whether files or actions. More particularly, the produce operation 211 of an event generating back end 123 produces selected target events or actions. The produce operation 211 of a code generating back end 123 produces target code files. These operations of the generic back end 203 and the individual back ends 123 are more fully described in the next section.

Operation of the Compiler

Figure 4A:
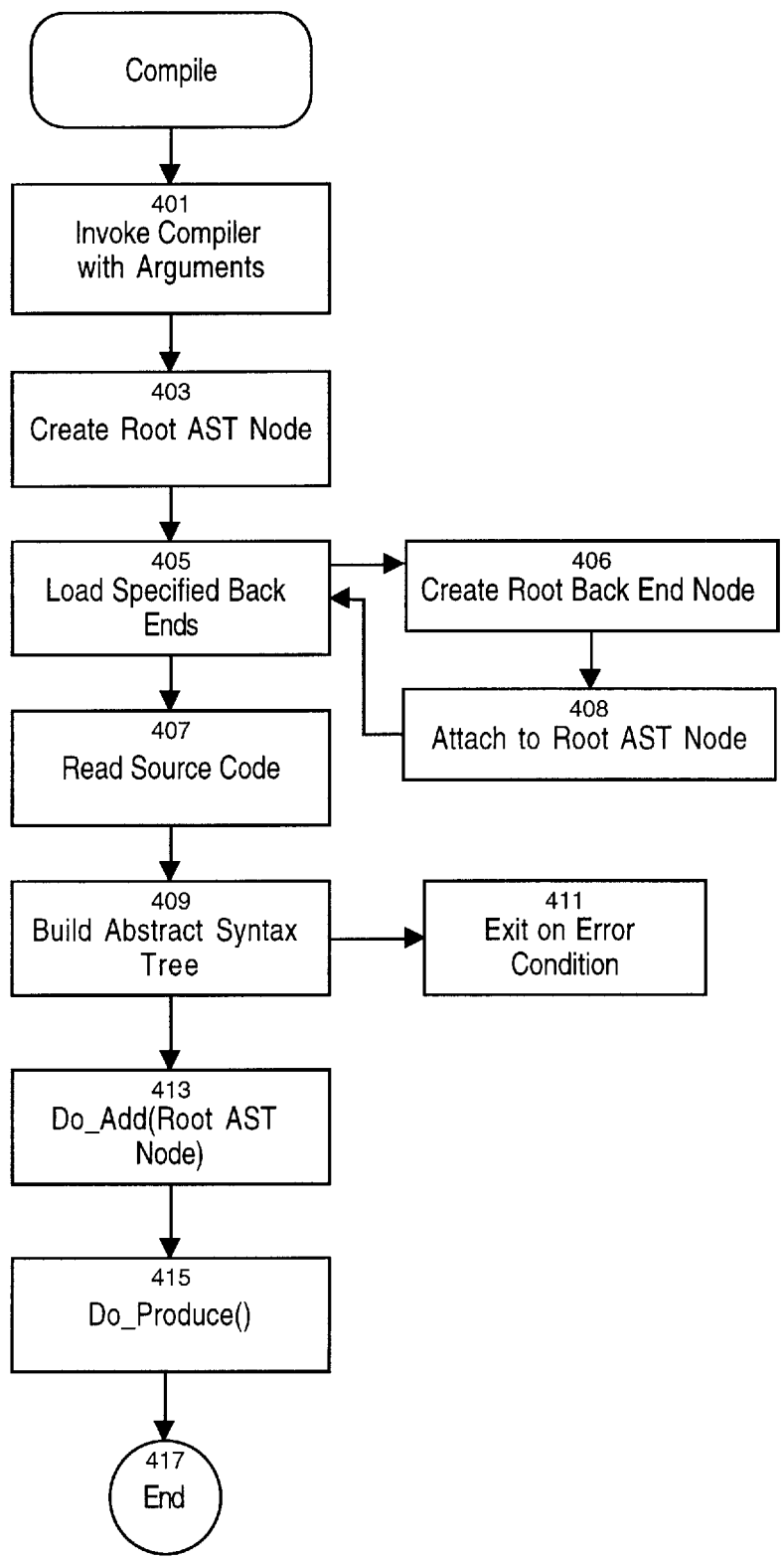
FIG. 4a through 4c are flowcharts of the operations of the generic back end and individual back ends.

Referring now to FIG. 4a, there is shown a flowchart of the operation of the compiler 109 to produce the target output files and actions by dynamically loading and operating the individual back ends 123. The compiler 109 is invoked 401 with a number of arguments specifying the source code files to be processed, the back ends 123 to be used for processing, and any other relevant options. The front end 201 then creates 403 the root node of an abstract syntax tree for the source code file or files. FIG. 3a illustrates the abstract syn tax tree 300 having only its root AST node 301.

The generic back end 203 loads 405 the back ends 123 specified in the command line arguments. As each back end 123 is loaded 405, each back end 123 creates 406 a root back end node 501 for a back end tree 500 associated with the back end 123. The back end 123 then attaches 408 its root back end node 501 to the root AST node 301. The root back end nodes 501 are attached 408 according to a priority value for each back end 123, as further described below. This may involve inserting a root back end node 501 before other, previously attached root back end nodes 501. FIG. 3b illustrates the abstract syntax tree 300 following the attachment of four root back end nodes 501. The root back end nodes 501 are labeled A1 through D1.

The front end 201 then reads 407 the source code files, and populates 409 the abstract syntax tree 300 in a conventional manner, representing the syntax structure of the source code file, and any included files. If an error in the source code file is detected, or is generated during tree population, the compiler 109 will exit 411. FIG. 3c illustrates the abstract syntax tree 300 following population 409.

In FIG. 3c there is shown four root back end nodes 501 for four back ends 123 operating in conjunction with the generic back end 203. These root back end nodes 501 may be for one or more of an: annotation back end 123a for generating data type information used by other back ends 123, a code generating back end 123c for generating target code files, such x.hh or xtypes.hh code files, or an event generating back end 123b, such as for loading an interface repository with an interface definition from the source code file.

As described above, the generic back end 203 includes an attach operation 205 that attaches a back end node 509 to a particular AST node 309 specified as an input parameter to the attach operation. The attach operation 205 has two logical, but not necessarily actual, parameters. The first parameter specifies an AST node 309 in the abstract syntax tree 300 to which a back end node 509, specified in the second parameter, is attached. In an object oriented embodiment, the attach operation is included in each AST node 309, so that for a given AST node 309, the attach operation is invoked (in C++) as ast_node→attach(back_end_node) where the nodes are specified with pointers. Other equivalent notations and data types may be used in other object oriented languages, or procedural languages. In a procedural embodiment, the attach operation is included in the procedural code of the generic back end 203, and would directly specify the parameters to the operation. In any embodiment, the attach operation 205 is executed by the processor 115 during the execution of the compiler 109 and generic back end 203.

The particular order in which the generic back end 203 attaches the back end nodes 509, including the order in which the root back end nodes 501 are attached 408, may be controlled to improve back end processing of the abstract syntax tree 300. In many cases, different back ends 123 share underlying data type information or other information that is useful to the production of their individual back end trees. For example, code generating back ends 123c for C and C++ would share common code for determining the sizes of data types in C or C++, or their type codes. Accordingly, it is desirable to have back end nodes 509 representing such common information available in the back end trees 500 prior to building or adding other back end nodes 509 that depend or reference such back end nodes or their common information.

In a preferred embodiment, the generic back end 203 satisfies this need by ordering the back end nodes 509 attached to each AST node 309 according to a priority level of the back end 123 associated with each back end node 509. In this preferred embodiment, the attach operation 205 attaches a specified back end node 509 according to a priority value of the back end 123 associated with the back end node 509. The priority level of the back ends 123 is preferably determined by a producer-consumer relationship between the different back ends 123 used in the system. Producer back ends, such as an annotation back end 123a, have higher priority than consumer back ends, such as a code generating back end 123c or event generating back end 123b. The particular priority ordering of any actual back end 123 depends on the other back ends 123 used in the system 100. The compiler developer can specify the priority level for each back end 123. In addition, priority can be established between back ends 123 of a given type. In alternate embodiments, priority schemes other than producer-consumer relationships, may be employed to determine a priority level of each back end 123.

Accordingly, the root back end nodes 501 are attached 408 to the root AST node 301 by the generic back end 203 according to the priority level of their respective back ends 123.

Once the abstract syntax tree 300 is populated 409, the generic back end 203 invokes a Do_Add operation on the root AST node 301. The Do_Add operation coordinates the individual back ends 123 to build their back end trees 500, each back end 123 processing selected AST nodes 309. The Do_Add operation calls each back end node 509 attached to each AST node 309, invoking an add operation 209 on each child AST node 303. The add operation 209 adds a back end node 503 to the back end tree 500 where the source token represented by the AST node 309 is relevant to the functionality of the back end 123. In some cases, the add operation 209 does not add a back end node 503 to the back end tree 500, because the underlying AST node 309 is not relevant to the target output of the back end 123. The Do_Add operation is preferably recursive, so that when the Do_Add is completed on the root AST node 301, the entire abstract syntax tree 300 has been traversed, and each back end tree 500 represents the output of the respective back end 123. The generic back end 201 then invokes 415 a Do_Produce operation, which in turn invokes the produce operation 211 of each back end 123 to produce the relevant target output files or actions for the back end 123.

Figure 4B:
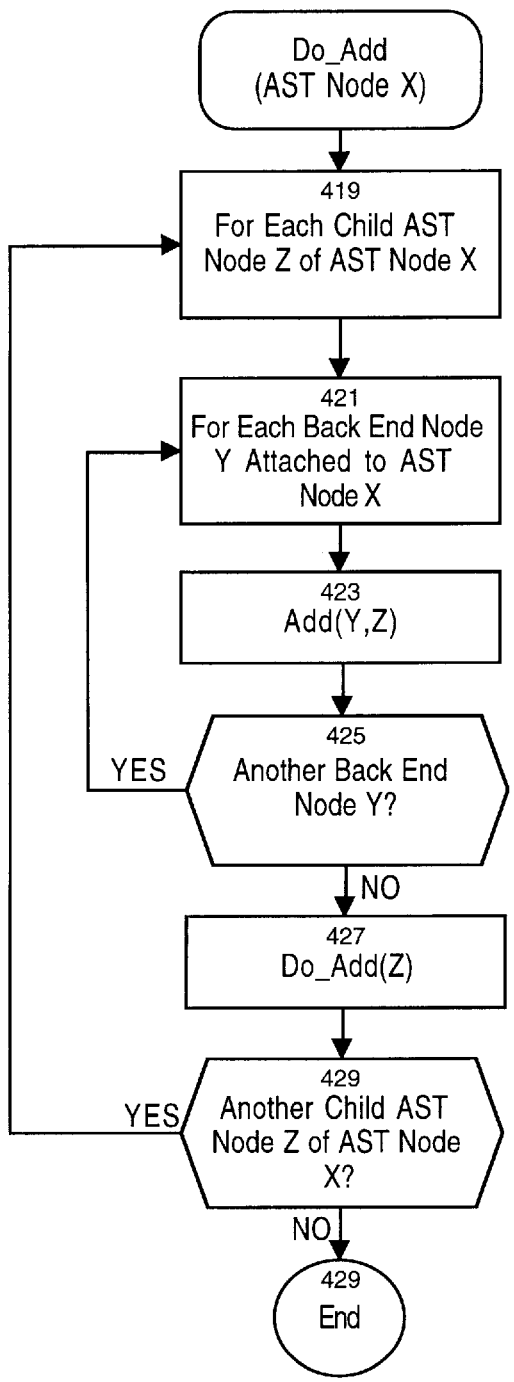
Figure 4C:
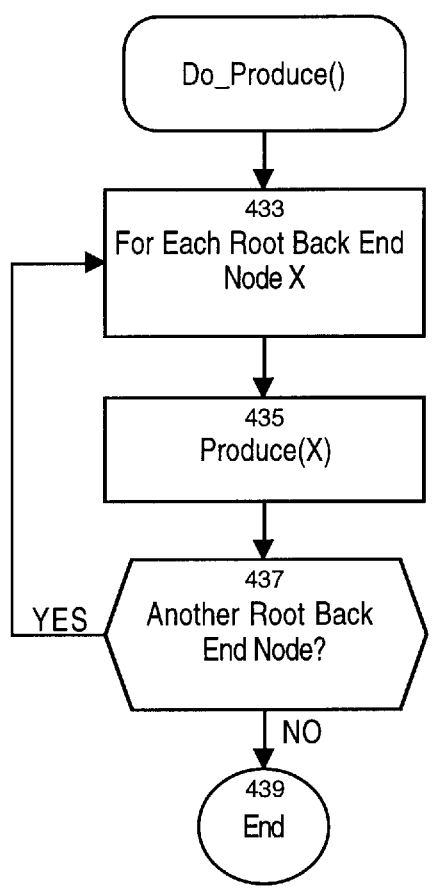
Figure 4D:
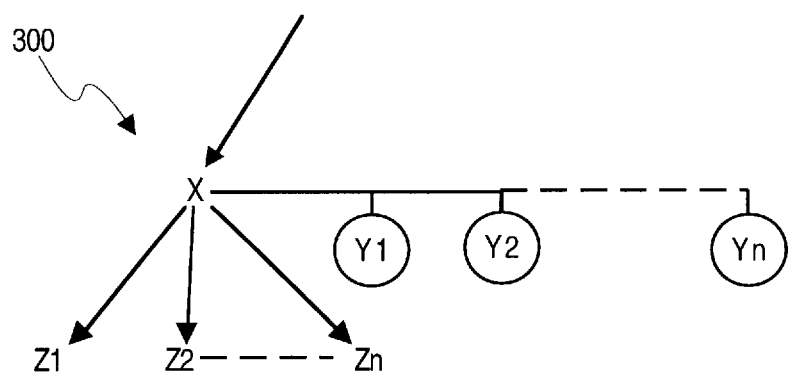
FIG. 4d is an illustration of the calling order of the Do_Add operation of FIG. 4b.

FIG. 4b illustrates one embodiment of the logic of the Do_Add operation. When the Do_Add operation is invoked, an AST node 309, here specified as "X", is passed in as the initial parameter. A pair of nested loops controls the processing in Do_Add. The outer loop iterates 419 over each child AST node Z of AST node X, and the inner loop iterates 421 over each back end node Y attached to the AST node X. This allows each such back end node to process each of the child AST nodes Z. These relationships of the various nodes are shown in FIG. 4d. In FIG. 4d, a portion of an abstract syntax 300 is shown, with an AST node 309, here node X, and any number of children AST nodes 303, here nodes Z1 through Zn. Attached to node X are any number of back end nodes 509, here labeled nodes Y1 through Yn.

In the core of the loops, the add operation 209 of a back end node Y is invoked 423 on the child AST node Z. In the example of FIG. 4d, the add operation 209 of Y1 would be invoked on Z1, and then Y2 on Z1, and so on, through Yn. The add operation 209 determines whether the child AST node Z is relevant to the back end tree 500 of the back end 123. This determination may be based on the data type of the child AST node Z or its parent AST node X, or more generally, on the desired structure of the back end tree 500. For example, the add operation 209 of a back end node 509 for a code generating back end 123c, would not add a back end node for a AST node Z that represents a token from an included source code file. If the child AST node Z is relevant to the back end 123 functionality, then one or more new back end node(s) 509 are created and added to the back end tree 500. In addition, the add operation 209 may invoke the attach operation 205 on any number of AST nodes 309, to attach the newly created back end node(s) 509 to such AST node(s) 309.

As indicated, the add operation 209 includes two logical, though not necessarily actual, parameters. A first parameter specifies the back end node Y in the back end tree 500 associated with the AST node X on which the add operation 209 is to be performed, and a second parameter specifies a child AST node Z of the AST node X. In an object oriented embodiment, the add operation 209 is included in each of nodes of the back end tree 500. For example, in C++, the invocation may be Y→add(Z) where "Y" and "Z" are pointers to nodes in the respective trees. In a procedural embodiment, the add operation 209 is part of the procedural code for each back end 123. In either case, each back end 123 controls the functionality of the add operation 209. In a preferred embodiment, there is an add operation 209 for each data type available in the source code programming language. For example, for a compiler 109 operating on IDL source code files, there are individual add operations for adding back end nodes representing structs, interfaces, modules, constants, exceptions, typedefs, and the like to the individual back end trees 500. Each of these particular add operations 209 is optimized for analyzing their associated data type and extracting information therefrom.

Once the add operation 209 terminates, the generic back end 203 determines 425 if there are any remaining back end nodes Y for the AST node X. If so, processing continues until all such attached back end nodes Y have been processed on the child AST node Z of AST node X. The generic back end 203 then recursively invokes 427 Do__Add on the child AST node Z of the current AST node X. This recursive call will traverse down the abstract syntax tree 300, again invoking Do__Add on the children of AST node Z, until completion. Once this recursive call is completed, the generic back end 203 determines 429 whether there are any remaining child AST nodes Z of AST node X, and if so, will continue the outer loop 419. This will cause all children of AST node X to be processed as described. In an alternate embodiment, the inner and outer loops may be swapped, with adjustment of the timing of the recursive call on Do__Add.

FIG. 3d illustrates the result of invoking 413 Do__Add on the root AST node 301 of the abstract syntax tree 300 shown in FIG. 3c. First, Do__Add is invoked on T1, so that for each of its children, T2 and T3, the root back end nodes A1, B1, C1 and D1 are invoked 421, in order. On each child AST node T2 and T3, the Do__Add recurses down the branch, calling the add operation 209 of each back end node that is attached thereto. When complete, there will be four back end trees 500a–500d, each with its back end nodes 503 attached to respective AST nodes 309. FIG. 3d also illustrates the variability of the back end trees 500. Back end tree 500a is a replica of the abstract syntax tree 300, but tree 500b contains only the root back end node 501, since all of the information that the back end 123 needs is already available in suitable form in the abstract syntax tree 300. Likewise, back end tree 500c only makes use of one branch of the abstract syntax tree 300, and the back end nodes 509 of tree 500c may contain new information useful to that back end 123 for producing its target outputs. Back end tree 500d illustrates a possible restructuring of the back end tree, with node D6 depending from the root back end node D1, even though AST node T6 depends from AST node T5 in the abstract syntax tree 300.

Referring again to FIG. 4a, once the Do__Add process is completed, the generic back end 203 invokes 415 the Do__Produce process to initiate the actual generation of the target code and actions of the back ends 123. FIG. 4c illustrates the logic of Do__Produce. When invoked, the generic back end 203 iterates 433 over each root back end node X attached to the root AST node 301. On this node the generic back end 203 invokes a produce method, which then traverses the particular back end tree 500 depending from the root back end node X, generating the target code files or actions in accordance with the compiler designer's specifications. When all of the root back end nodes have been exhausted 417, the Do__Produce terminates 437.

During actual execution of an individual back end 123, there may be a further need to locate information that is provided by back end nodes 509 from higher priority back ends 123. Typically, a back end 123 needs information from one or more back end nodes 509 when processing another AST node 309 or back end node 509. Such nodes may not be in the same back end tree 500 as the currently active node. To provide this type of information access, there is provided with each back end 123 a family identification value. The family identification value is an attribute that is shared by all back end nodes associated with a given back end 123, and all the nodes in the individual back end trees 500, thereby identifying each such back end node 509 as belonging to that particular back end 123.

The generic back end 203 thereby includes a lookup operation 207 that takes as parameters an AST node 309, and a family identification value. The generic back end 203 returns the one or more back end nodes 509 with the specified family identification value that are attached to the specified AST node 309. From this node or nodes, the requesting back end 123 may extract the needed information, such as data type sizes, type codes, or the like. FIG. 2 illustrates the data flow of the lookup operation 207. In FIG. 3d, for example, the back end 123 associated with back end tree 500d may need information from back end node A3 in order to create back end node D3 and attach it to AST node T3. Accordingly, the back end 123 associated with node D1 would invoke the lookup operation 207, passing in AST node T3, and a family identification value for the back end 123 associated with back end tree 500a. The generic back end 203 would then return back end node A3, from which the back end 123 would extract the information needed to create back end node D3.

We claim:

1. An apparatus for compiling a source code file and producing variable target outputs therefrom, the apparatus comprising:

a front end that accepts the source code file and produces therefrom an abstract syntax tree that represents the syntactic structure of the source code file, the abstract syntax tree having at least one abstract syntax tree node;

at least one back end that produces an associated back end tree from the abstract syntax tree, and further produces from the back end tree a target output, the back end tree having at least one back end tree node attached to an abstract syntax tree node; and a generic back end that controls and sequences execution of the at least one back end to produce an associated back end tree from each back end, wherein each back end is independent of the generic back end and is dynamically loaded by the apparatus during execution.

2. The apparatus of claim 1 wherein the generic back end sequences execution by invoking in a selected order each back end associated with each back end node attached to each abstract syntax tree node.

3. The apparatus of claim 1 further comprising:

a memory device that stores the abstract syntax tree, the at least one back end tree, the generic back end, and the at least one back end; and a processing device that executes the generic back end and the at least one back end to produce from the at least one back end at least one target output.

4. A method for compiling a source code file and producing variable target outputs therefrom, the method comprising the steps of:

receiving a source code file;

executing a compiler having a front end and a generic back end;

loading at least one back end to operate with the generic back end;

creating an abstract syntax tree from the source code with the front end, the abstract syntax tree including a root node and at least one child node;

generating, under the control of the generic back end, from each back end a back end tree associated with the back end, the back end tree having at least one back end tree node attached to an abstract syntax tree node;

attaching to the root node of the abstract syntax tree a back end node of at least one back end tree;

selecting nodes of the abstract syntax tree, and for each selected node, adding to selected back end trees zero or more back end nodes representing syntactic information derived from the abstract syntax tree;

attaching selected back end nodes to selected nodes of the abstract syntax tree; and producing from each back end a target output.

5. The method of claim 4, wherein the step of generating a back end tree is performed by selectively invoking each back end on selected nodes of the abstract syntax tree.

6. The method of claim 4 further comprising the step of:

repeating the selecting step on each back end node attached to each node of the abstract syntax tree.

7. The method of claim 4, wherein each attaching step further comprises the step of:

attaching the back end node to the abstract syntax tree according to a priority value corresponding to a priority value of the back end associated with the back end node.

8. The method of claim 7, further comprising the step of:

attaching selected back end nodes associated with one back end to the abstract syntax tree in a predetermined order.

9. The method of claim 4 wherein the step of selecting nodes of the abstract syntax tree is performed recursively.

10. A computer system for compiling a source code file and producing variable target outputs therefrom, the apparatus comprising:

a memory device that stores:

an abstract syntax tree that represents the syntactic structure of the source code file and having at least one abstract syntax tree node;

at least one back end tree associated with a back end and derived from the abstract syntax tree, each back end tree having at least one back end tree node attached to an abstract syntax tree node;

at least one back end that produces from the abstract syntax tree a back end tree associated with the back end, and further produces from the back end tree a target output, each back end independent of a compiler, and dynamically loaded by the compiler during execution, each back end invoked by a generic back end in the selected order;

the compiler comprising:

a front end that accepts the source code file and produces therefrom the abstract syntax tree;

a generic back end that coordinates construction of the at least one back end tree by invoking a back end associated with at least one back end tree node attached to an abstract syntax tree node in a selected order; and a processing device that executes the generic back end and the at least one back end to produce from the at least one back end at least one target output.

11. An apparatus for compiling a source code file and producing variable target outputs therefrom, the apparatus comprising:

a front end that accepts the source code file and produces therefrom an abstract syntax tree that represents the syntactic structure of the source code file, the abstract syntax tree having at least one abstract syntax tree node;

at least one back end that produces an associated back end tree from the abstract syntax tree, and further produces from the back end tree a target output, the back end tree having at least one back end tree node attached to an abstract syntax tree node; and a generic back end that controls and sequences execution of the at least one back end to produce an associated back end tree from the at least one back end, wherein each back end is independent of the generic back end and is dynamically loaded by the apparatus during execution; and wherein each back end further comprises:

an add operation, invocable by the generic back end, that adds zero or more back end nodes to a back end tree.

12. The apparatus of claim 11, wherein the generic back end further comprises:

an attach operation, invocable by a back end, that attaches a back end node of a back end tree to at least one node of the abstract syntax tree.

13. The apparatus of claim 12, wherein each back end node is attached to the abstract syntax tree according to a priority value corresponding to a priority value of the back end associated with the back end node.

14. The apparatus of claim 13, wherein selected back end nodes associated with one back end are attached to the abstract syntax tree in a predetermined order.

15. The apparatus of claim 11, wherein each back end node is an object and the add operation is a method of the object.

16. An apparatus for compiling a source code file and producing variable target outputs therefrom, the apparatus comprising:

a front end that accepts the source code file and produces therefrom an abstract syntax tree that represents the syntactic structure of the source code file, the abstract syntax tree having at least one abstract syntax tree node;

at least one back end that produces an associated back end tree from the abstract syntax tree, and further produces from the back end tree a target output, the back end tree having at least one back end tree node attached to an abstract syntax tree node; and, a generic back end that controls and sequences execution of the at least one back end to produce an associated back end tree from the at least one back end, wherein each back end is independent of the generic back end and is dynamically loaded by the apparatus during execution; and each back end and each back end node associated with the back end has a family identification value, the generic back end further comprising:

a look up operation that returns zero or more nodes from at least one back end tree having a family identification value and attached to a node of the abstract syntax tree in response to a request from a back end specifying the family identification value and the node of the abstract syntax tree.

17. A method for compiling a source code file and producing variable target outputs therefrom, comprising the steps of:

receiving a source code file;

executing a compiler having a front end and a generic back end;

loading at least one back end to operate with the generic back end;

creating an abstract syntax tree from the source code file with the front end, the abstract syntax tree including a root node and at least one child node;

generating, under the control of the generic back end, from each back end, a back end tree associated with the back end, the back end tree having at least one back end node attached to an abstract syntax tree node, each back end and back end node associated therewith having a family identification value;

producing from each back end tree a target output;

receiving a request specifying a family identification value and a node of the abstract syntax tree; and returning zero or more back end nodes from at least one back end tree having a same family identification value and attached to the specified node of the abstract syntax tree.

* * * * *